United States Patent
Liu et al.

(10) Patent No.: US 10,744,652 B2
(45) Date of Patent: Aug. 18, 2020

(54) ADAPTIVE METHOD FOR CONTROLLING AN ELECTRIC GRIPPER, AND THE ELECTRIC GRIPPER

(71) Applicant: Hiwin Technologies Corp., Taichung (TW)

(72) Inventors: Jonus Liu, Taichung (TW); Chia-Yu Hu, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 331 days.

(21) Appl. No.: 15/985,765

(22) Filed: May 22, 2018

(65) Prior Publication Data

US 2019/0358829 A1 Nov. 28, 2019

(51) Int. Cl.
*G06F 17/00* (2019.01)
*B25J 15/02* (2006.01)
*G05B 13/04* (2006.01)
*G05B 6/02* (2006.01)

(52) U.S. Cl.
CPC ............... *B25J 15/02* (2013.01); *G05B 6/02* (2013.01); *G05B 13/041* (2013.01); *G05B 13/042* (2013.01)

(58) Field of Classification Search
CPC .......... B25J 15/02; G05B 6/02; G05B 13/041; G05B 13/042
USPC ....................................................... 700/250
See application file for complete search history.

(56) References Cited

U.S. PATENT DOCUMENTS

| | | | | | |
|---|---|---|---|---|---|
| 5,157,518 | A | * | 10/1992 | Ohtaki | ............... H04N 1/40056 358/443 |
| 2018/0072327 | A1 | * | 3/2018 | Seppelt | ................... G06N 20/00 |

FOREIGN PATENT DOCUMENTS

| | | |
|---|---|---|
| DE | 3439495 A1 | 5/1985 |
| DE | 102008020489 B4 | 11/2016 |
| DE | 102016208362 A1 | 11/2017 |
| JP | 7-115521 B2 | 12/1995 |
| JP | 2010124653 A | 6/2010 |
| KR | 10-1711996 B1 | 3/2017 |
| KR | 10-1734884 B1 | 5/2017 |

OTHER PUBLICATIONS

Search Report appended to an Office Action issued to Taiwanese counterpart application No. 106143660 by the TIPO on Mar. 26, 2018, with an English translation thereof.
The Office Action issued to German counterpart application No. 102018208934.5 by the German Patent Office on Jan. 7, 2019, 4 pages [no English translation].

* cited by examiner

*Primary Examiner* — Ronnie M Mancho
(74) *Attorney, Agent, or Firm* — Birch, Stewart, Kolasch & Birch, LLP

(57) ABSTRACT

An adaptive control method includes steps of: storing N number of different speed setting values; assigning an i-th one of the speed setting values to serve as a target speed value; sampling, when the gripping module is performing a first action in a steady state period, a feedback voltage signal resulting from the gripping module to obtain Stall Guard Values (SGVs); averaging the SGVs to obtain an average SGV; and calculating, based on the average SGV and a predetermined SGV deviation, a Stall Guard Threshold (SGT) for subsequent control of the electric gripper.

9 Claims, 10 Drawing Sheets

ADAPTIVE METHOD FOR CONTROLLING AN ELECTRIC GRIPPER, AND THE ELECTRIC GRIPPER

FIELD

The disclosure relates to an adaptive control method, and more particularly to an adaptive control method for an electric gripper.

BACKGROUND

To control an electric gripper, a control module transmits a driving signal to a gripping module of the electric gripper so as to drive the gripping module to perform a target action at a speed of a target speed value. However, the driving signal is usually recorded in the control module in advance, without considering factors that may influence operation of the electric gripper in practice, such as an operating temperature, oscillations from a platform, or inaccurate estimation of dimensions of an object to be gripped. Consequently, the electric gripper may function abnormally or fail when the gripping module is driven to perform certain target action at a speed of a particular target speed value.

SUMMARY

Therefore, an object of the disclosure is to provide an adaptive control method and an electric gripper that can alleviate at least one of the drawbacks of the prior art.

According to one aspect of the disclosure, the adaptive control method is to be implemented by the electric gripper including a gripping module and a control module. The control module generates a driving voltage to control actions to be performed by the gripping module. The adaptive control method includes steps of:

(a) storing, by the control module, N number of different speed setting values, where N is a positive integer not smaller than two;

(b) assigning, by the control module, an i-th one of the speed setting values to serve as a target speed value, where i is a positive integer not greater than N and starts from one;

(c) sampling, by the control module when the gripping module is performing a first action which is one of the actions in a steady state period during which the gripping module performs said one of the actions at a speed of the target speed value, a feedback voltage signal resulting from the gripping module and associated with the driving voltage to obtain a plurality of Stall Guard Values (SGVs);

(d) averaging, by the control module, the SGVs to obtain an average SGV that corresponds to the target speed value and the first action; and (e) when it is determined by the control module (2) that i is not equal to N, repeating, by the control module (2), steps (b) to (d) with i increased by one, and when it is determined by the control module that i is equal to N, for each of the speed setting values that was assigned to serve as the target speed value, calculating, by the control module based on the average SGV and a predetermined SGV deviation that is determined in advance in accordance with the speed setting value and the first action during performance of which the feedback voltage signal was sampled to obtain the plurality of SGVs, a Stall Guard Threshold (SGT) which is utilized for subsequent control of the electric gripper.

According to another aspect of the disclosure, the electric gripper includes a gripping module and a control module. The control module is configured to generate a driving voltage to control actions to be performed by the gripping module. The control module is configured to store N number of different speed setting values, where N is a positive integer not smaller than two. The control module is configured to, for each i, where i is a positive integer from one to N with an increment of one, assign an i-th one of the speed setting values to serve as a target speed value, sample, when the gripping module is performing one of the actions in a steady state period during which the gripping module performs the one of the actions at a speed of the target speed value, a feedback voltage signal resulting from the gripping module and associated with the driving voltage to obtain a plurality of SGVs, average the SGVs to obtain an average SGV that corresponds to the target speed value and the first action, and calculate, based on the average SGV and an SGV deviation that is determined in advance in accordance with the target speed value and said one of the actions during performance of which the feedback voltage signal was sampled to obtain the plurality of SGVs, an SGT which is utilized for subsequent control of the electric gripper.

According to yet another aspect of the disclosure, another adaptive control method for an electric gripper is to be implemented by the electric gripper including a gripping module and a control module, which generates a driving voltage to control actions to be performed by the gripping module. The adaptive control method includes steps of:

(a) storing, by the control module, N number of different speed setting values, where N is a positive integer not smaller than two;

(b) assigning, by the control module, one of the speed setting values to serve as a target speed value;

(c) sampling, by the control module when the gripping module is performing one of the actions in a steady state period during which the gripping module performs said one of the actions at a speed of the target speed value, a feedback voltage signal resulting from the gripping module and associated with the driving voltage to obtain a plurality of Stall Guard Values (SGVs);

(d) averaging, by the control module, the SGVs to obtain an average SGV that corresponds to the target speed value and said one of the actions; and (e) calculating, by the control module based on the average SGV and a predetermined SGV deviation that is determined in advance in accordance with the target speed value and said one of the actions during performance of which the feedback voltage signal was sampled to obtain the plurality of SGVs, a Stall Guard Threshold (SGT) which is utilized for subsequent control of the electric gripper.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
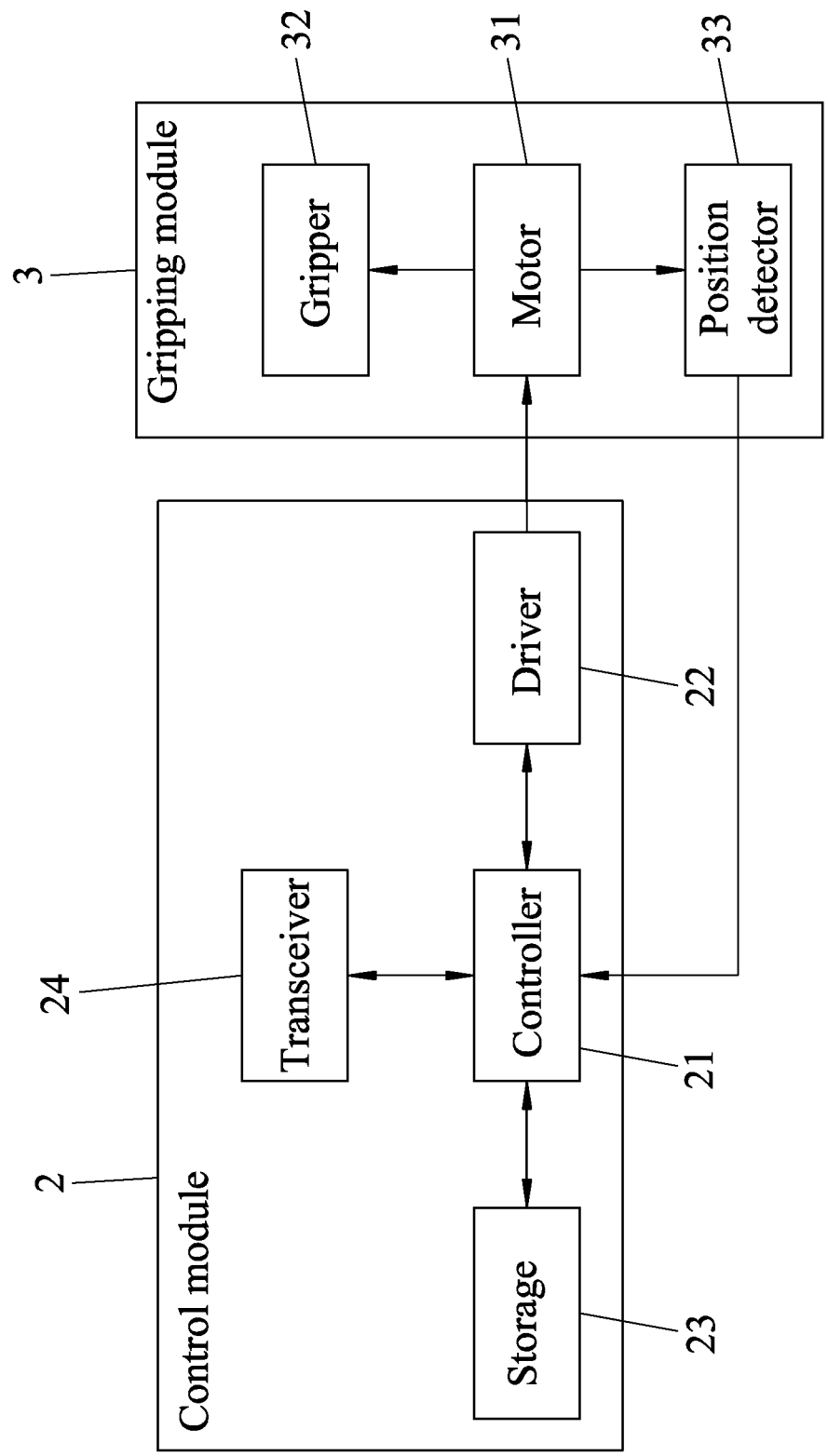
FIG. 1 is a block diagram illustrating an embodiment of an electric gripper according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of an electric gripper according to this disclosure is illustrated. The electric gripper includes a control module 2 and a gripping module 3. In this embodiment, the gripping module 3 is configured to perform a selected one of multiple actions, including in this embodiment, a first action (e.g., opening of the electrical gripper) and a second action (e.g., closing of the electrical gripper).

Figure 4:
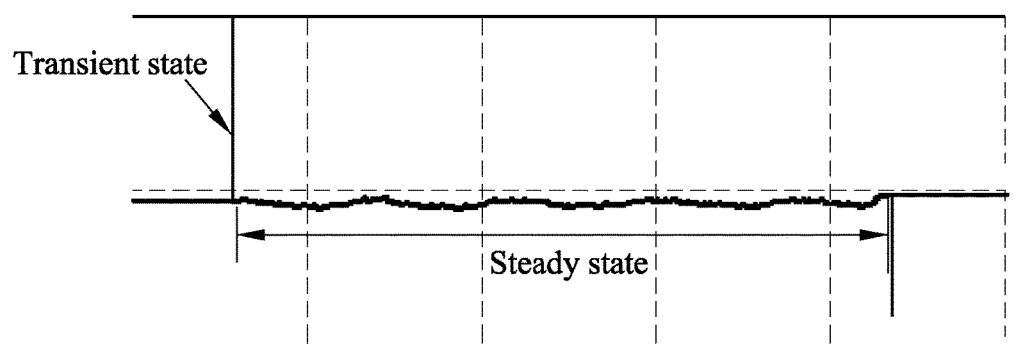
FIG. 4 is a plot illustrating an embodiment of the feedback voltage signal that includes transient-state and steady-state portions.

The control module 2 is configured to generate a driving voltage and to output the driving voltage to the gripping module 3 to control the actions to be performed by the gripping module 3. The control module 2 is configured to store N number of different speed setting values, where N is a positive integer not smaller than two. The control module 2 is configured to assign an i-th one of the speed setting values to serve as a target speed value, where i is a positive integer not greater than N and starts from one. The control module 2 is configured to sample, when the gripping module 3 is performing the first action selected from the actions in a steady state period, a feedback voltage signal (as shown in FIG. 4) that results from the gripping module 3 to obtain a plurality of Stall Guard Values (SGVs) Herein, the steady state period of an action is defined as a period during which the gripping module 3 performs the action at a speed of the target speed value. In one embodiment, the driving voltage represents the electrical energy provided by the control module 2 to the gripping module 3, and the feedback voltage signal is a time-varying voltage signal that is converted by the control module 2 from a mechanical force fed back from the gripping module 3 while the gripping module 3 is driven by the driving voltage to perform one of the actions at a speed of one of the speed setting values.

Figure 3:
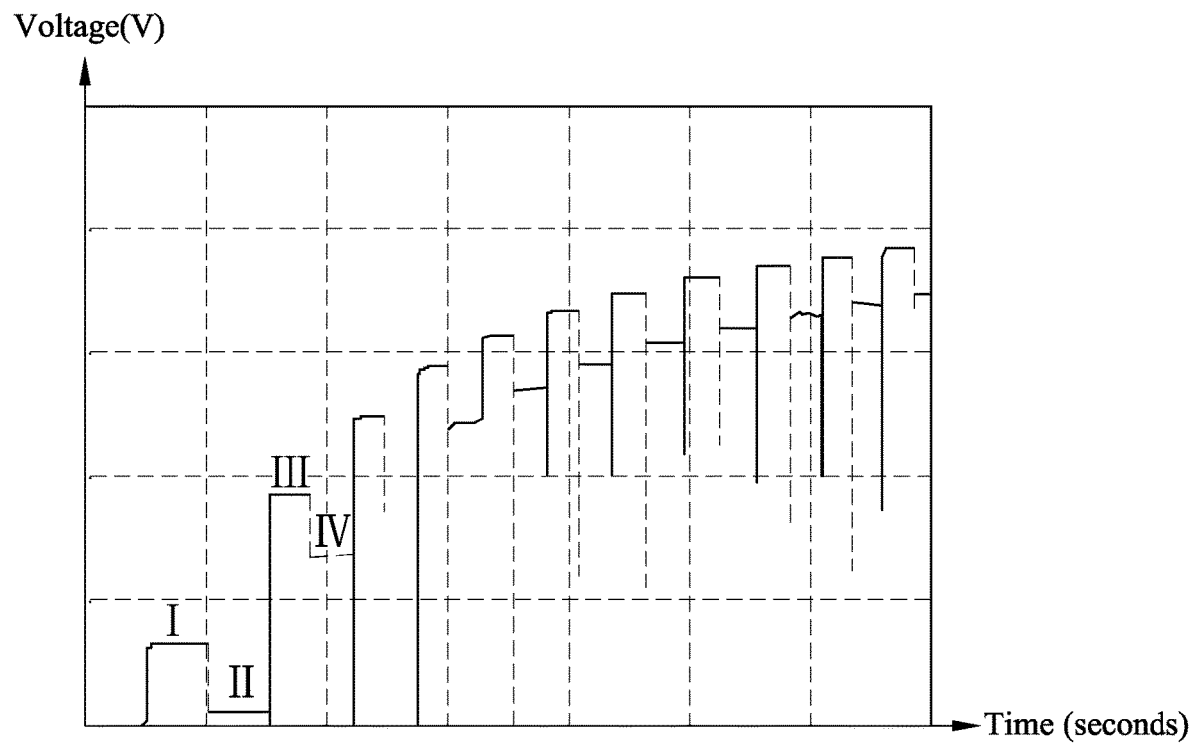
FIG. 3 is a plot illustrating an embodiment of a feedback voltage signal resulting from a gripping module which operates to perform different actions at different speed setting values.

FIG. 3 illustrates one embodiment of the feedback voltage signal which results from the gripping module 3 performing the first and second actions at the speed of the different speed setting values. For example, a part of a waveform marked with "I" at the top thereof represents the feedback voltage signal which results from the gripping module 3 performing the first action at the speed setting value of 1 mm/sec, and another part of the waveform marked with "II" at the top thereof represents the feedback voltage signal which results from the gripping module 3 performing the second action at the speed setting value of 1 mm/sec. Likewise, still another part of the waveform marked with "III" at the top thereof represents the feedback voltage value which results from the gripping module 3 performing the first action at the speed setting value of 2 ram/sec, and further another part of the waveform marked with "IV" at the top thereof represents the feedback voltage signal which results from the gripping module 3 performing the second action at the speed setting value of 2 mm/sec.

Figure 6:
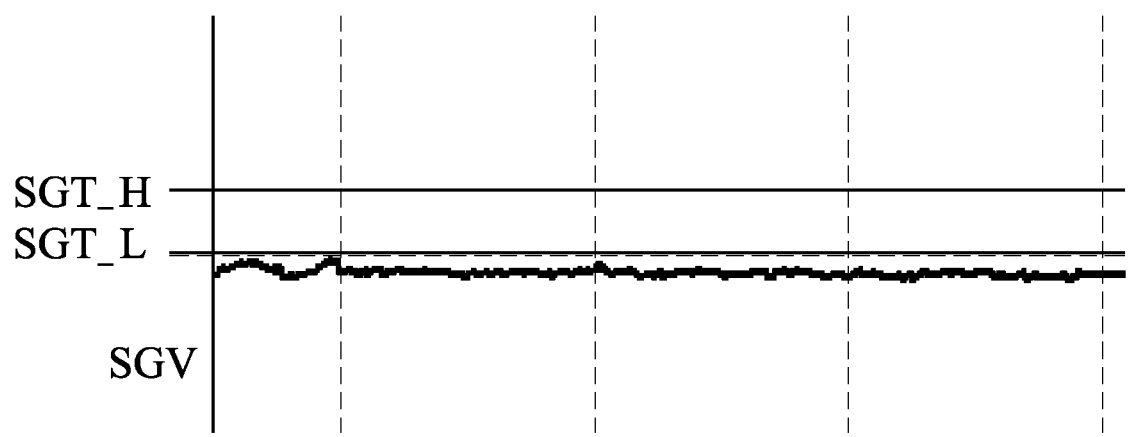
FIG. 6 is a plot illustrating embodiments of the feedback voltage signal, and an upper bound and a lower bound between which a Stall Guard Threshold (SGT) ranges.

The control module 2 is configured to average the SGVs to obtain an average SGV that corresponds to the target speed value and the one of the actions being performed. The control module 2 is configured to repeat the assignment of the i-th one of the speed setting values to serve as the target speed value, the sampling of the feedback voltage signal and the averaging of the SGVs for all i from one to N with an increment of one. When it is determined by the control module 2 that i is equal to N, for each of the speed setting values that is assigned to serve as the target speed value, the control module 2 is configured to calculate a Stall Guard Threshold (SGT) based on the average SGV and a predetermined SGV deviation that is determined in advance in accordance with the target speed value and the first action during performance of which the feedback voltage signal was sampled to obtain the SGVs. The SGT is utilized for subsequent control of the electric gripper. In this embodiment, the SGT is implemented to be a threshold value for the feedback voltage signal so as to enable the control module 2 to stop operation of the gripping module 3 when it is determined by the control module 2 that the feedback voltage signal satisfies the SGT. The SGT ranges between an upper bound of voltage value SGT_H and a lower bound of voltage value SGT_L as shown in FIG. 6. In addition, the SGT is an operational parameter utilized to control the electric gripper to accurately perform a desired one of the actions at the speed of a desired speed value. However, implementation of the SGT is not limited to the disclosure herein.

In this embodiment, the control module 2 and the gripping module 3 are two separate modules, but in other embodiments, the control module 2 may be integrated into the gripping module 3, and implementations thereof are not limited to what are disclosed herein.

Specifically speaking, the control module 2 includes a controller 21, a driver 22 electrically connected to the controller 21, a storage 23 electrically connected to the controller 21, and a transceiver 24 electrically connected to the controller 21. The gripping module 3 includes a motor 31 electrically connected to the driver 22, a gripper 32 coupled to the motor 31, and a position detector 33 electrically connected to the motor 31 and the controller 21. The driver 22 is configured to drive the motor 31 to control the gripper 32 to perform one of the first action and the second action, to generate the feedback voltage signal based on the mechanical force fed back from the motor 31, and transmit the feedback voltage to the controller 21. In this embodiment, the first action is implemented to be opening of the gripper 32, and the second action is implemented to be closing of the gripper 32. However, implementations of the first action and the second action are not limited to what are disclosed herein and may vary in other embodiments. The transceiver 24 is configured to transmit and receive information associated with operation of the controller 21. The storage 23 is configured to store data associated with operation of the electric gripper, such as the speed setting values, the SGVs and the SGT. The gripper 32 is configured to be actuated by the motor 31 to perform a reciprocating linear motion. The position detector 33 is configured to detect a shaft position of the motor 31, and to transmit to the controller 21 a result of the detection of the shaft position so as to enable the controller 21 to determine a gripping position of the gripping module 3 based on the shaft position of the motor 31. Moreover, based on the result of the detection of the shaft position by the position detector 33, the controller 21 is configured to determine an actual speed of gripping operation (e.g., an opening action or a closing action) performed by the gripping module 3. The gripping position may be defined as the relative position of fingers or a position of one of the fingers with respect to a reference point of the gripper 32, but implementation thereof is not limited to the disclosure herein. In this embodiment, the position detector 33 is implemented to be a rotary encoder, but implementation thereof is not limited to what is disclosed herein and may vary in other embodiments.

Subsequently, an adaptive control method for an electric gripper according to this disclosure will be described in the following. The adaptive control method is to be implemented by the electric gripper that is described previously. The adaptive control method includes a reset procedure and an operating procedure. The goal of the reset procedure is to establish a model for performance of each of the actions by the gripping module 3, and the goal of the operating procedure is to apply the model and update the model.

FIGS. 2A to 2D cooperatively illustrate an embodiment of the reset procedure of the adaptive control method according to this disclosure. The reset procedure of the adaptive control method includes steps (A) to (G) described as follows and illustrated in FIG. 2A.

In step (A), the controller 21 of the control module 2 stores N number of different speed setting values in the storage 23, where N is a positive integer not smaller than two.

In step (B), the controller 21 of the control module 2 assigns an i-th one of the speed setting values to serve as a target speed value, where i is a positive integer not greater than N and starts from one.

In step (C), when the gripping module 3 is driven by the driving voltage to perform the first action (i.e., the gripper 32 opens) selected from the actions in the steady state period during which the gripping module 3 performs the corresponding action at a speed of the target speed value, the controller 21 of the control module 2 samples the feedback voltage signal resulting from the gripping module 3 and associated with the driving voltage to obtain a plurality of SGVs.

Figure 2A:
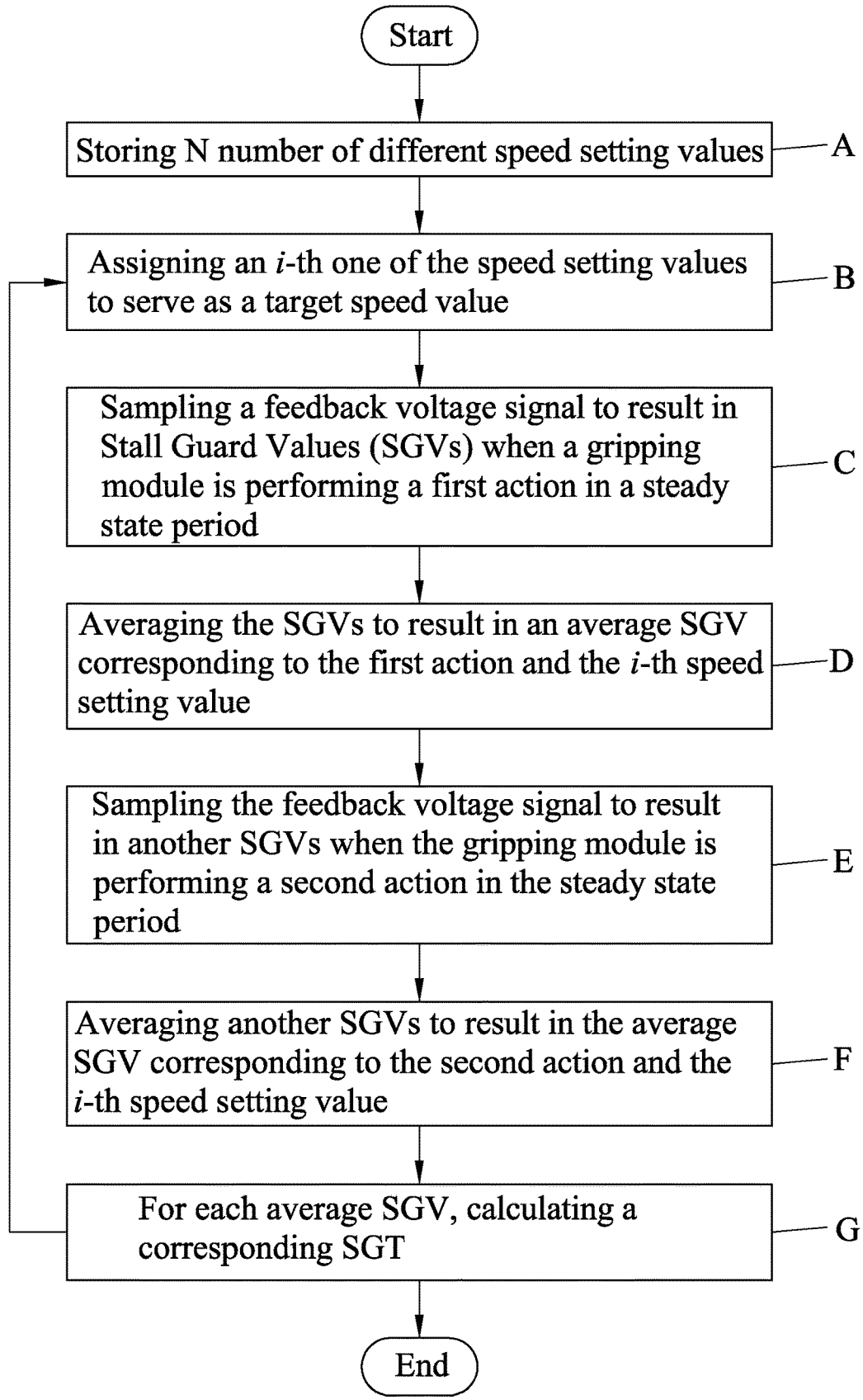
FIGS. 2A to 2D cooperatively illustrate a flow chart of an embodiment of a reset procedure of an adaptive control method according to the disclosure.
Figure 2B:
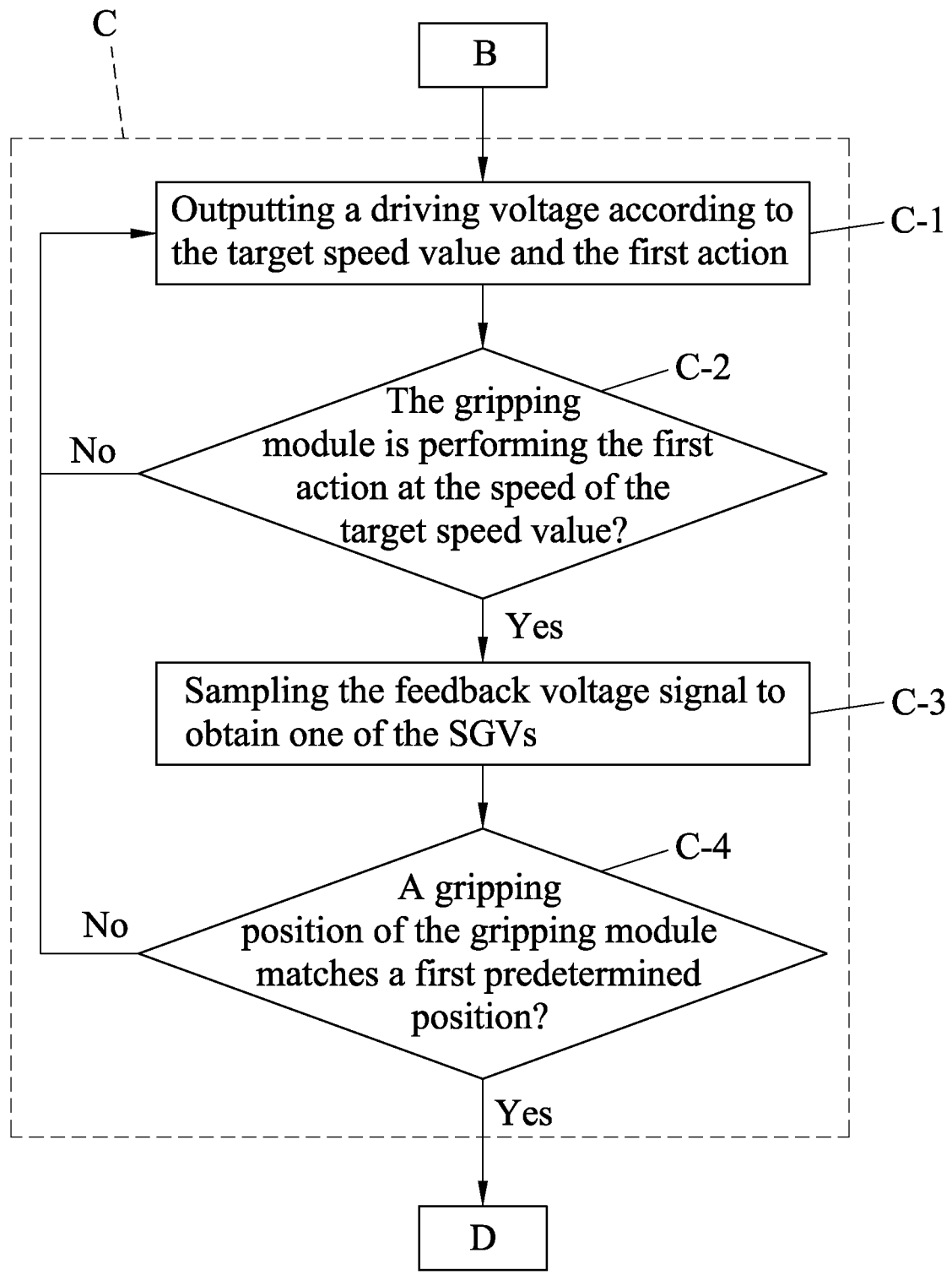

Specifically speaking, step (C) includes sub-steps (C-1) to (C-4) described in the following and illustrated in FIG. 2B.

In sub-step (C-1), the controller 21 of the control module 2 generates the driving voltage according to the target speed value (i.e., the i-th one of the speed setting values) and outputs the driving voltage so as to control the gripping module 3 to perform the first action. Specifically, the driving voltage is transmitted via the driver 22 to drive the motor 31 to actuate the gripper 32 to perform the first action.

In sub-step (C-2), the controller 21 of the control module 2 determines whether the gripper 32 of the gripping module 3 is performing the first action at the speed of the target speed value based on the result of the detection of the shaft position obtained by the position detector 33. The control module 2 performs sub-step (C-1) once again when it is determined that the gripper 32 of the gripping module 3 is not performing the first action at the speed of the target speed value.

When it is determined that the gripper 32 of the gripping module 3 is performing the first action at the speed of the target speed value, in sub-step (C-3), the controller 21 of the control module 2 samples the feedback voltage signal resulting from the gripping module 3 in the steady state period to obtain one of the SGVs, and stores said one of the SGVs in the storage 23 of the control module 2.

Referring to FIG. 4, the feedback voltage signal of the gripping module 3 includes two transient-state portions and a steady-state portion. The two transient-state portions, i.e., an upward pulse and a downward pulse occur respectively at a start and an end of the driving voltage that drives the gripping module 3 to perform the corresponding one of actions (i.e., the first action here). The steady-state portion, of which fluctuations of the voltage value are relatively smaller, corresponds to the steady state period during which the gripping module 3 performs the corresponding one of actions at the target speed value. Because the voltage value of the steady-state portion is more stable than those of the transient-state portions, the control module 2 samples only the steady-state portion of the feedback voltage signal to obtain the SGVs.

Figure 7:
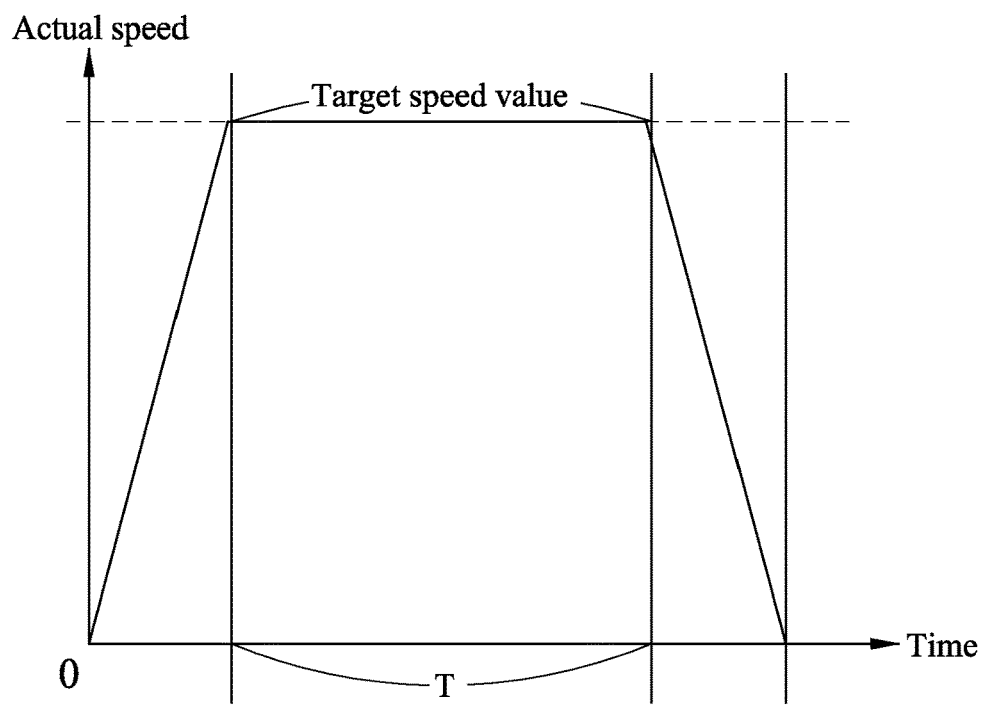
FIG. 7 is a plot illustrating an embodiment of an actual speed of a gripping module of the electric gripper that is driven to perform a first action at a speed of the target speed value.

FIG. 7 exemplifies an actual speed of the gripper 32 of the gripping module 3 which is driven to perform the first action at the speed of the target speed value under a condition that the i-th one of the speed setting values is assigned to serve as the target speed value. The gripper 32 of the gripping module 3 reaches the target speed value and remains there steadily for a time interval (T). That is to say, the steady state period during which the gripper 32 of the gripping module 3 performs the first action at the speed of the target speed value is the time interval (T).

In sub-step (C-4), the controller 21 of the control module 2 determines whether the gripping position of the gripping module 3 matches a first predetermined position that the gripping module 3 is expected to reach when being driven by the driving voltage to perform the first action at the speed of the target speed value. The controller 21 of the control module 2 performs sub-step (C-1) once again when it is determined that the gripping position does not match the first predetermined position, and proceeds to step (D) when it is determined that the gripping position matches the first predetermined position.

Figure 8:
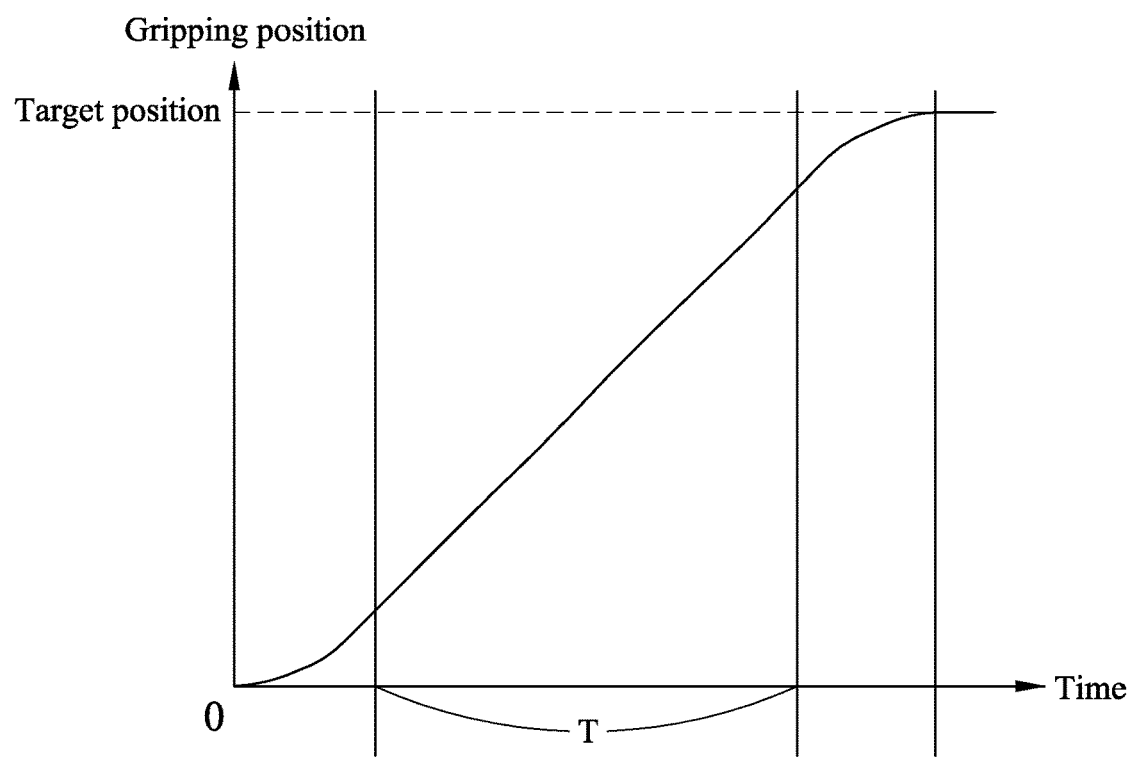
FIG. 8 is a plot illustrating an embodiment of a gripping position of the gripping module of the electric gripper that is driven to perform the first action at the speed of the target speed value and is expected to reach a first predetermined position.

FIG. 8 exemplifies a gripping position of the gripping module 3 which is driven to perform the first action at the speed of the target speed value, and the first predetermined position the gripping module 3 is expected to reach, where the gripping module 3 eventually reaches the first predetermined position and stops there.

In step (D), the controller 21 of the control module 2 averages the SGVs to obtain the average SGV that corresponds to the target speed value and the first action, which is the action being performed.

In step (E), when the gripping module 3 is performing the second action (i.e., the gripper 32 closes) selected from the actions in the steady state period, the controller 21 of the control module 2 samples the feedback voltage signal resulting from the gripping module 3 associated with the driving voltage to obtain another plurality of SGVs.

Figure 2C:
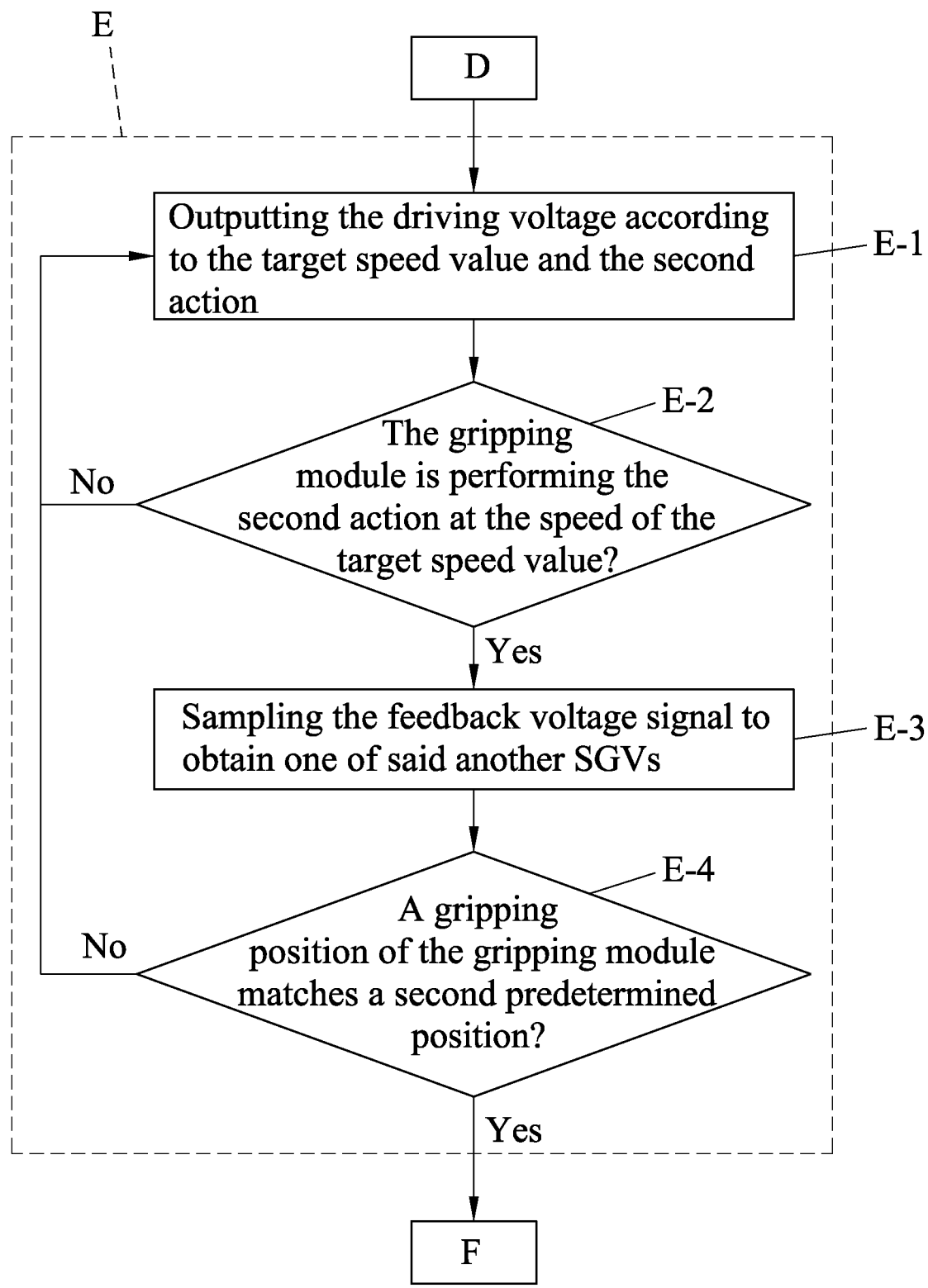

Specifically speaking, step (E) includes sub-steps (E-1) to (E-4) described in the following and illustrated in FIG. 2C. Sub-steps (E-1) to (E-4) are respectively similar to sub-steps (C-1) to (C-4).

In sub-step (E-1), the controller 21 of the control module 2 generates the driving voltage according to the target speed value (i.e., the i-th one of the speed setting values) and outputs the driving voltage so as to control the gripping module 3 to perform the second action. Specifically, the driving voltage is transmitted via the driver 22 to drive the motor 31 to actuate the gripper 32 to perform the second action.

In sub-step (E-2), the controller 21 of the control module 2 determines whether the gripper 32 of the gripping module 3 is performing the second action at the speed of the target speed value, and performs sub-step (E-1) once again when it is determined that the gripper 32 of the gripping module 3 is not performing the second action at the speed of the target speed value.

In sub-step (E-3), when it is determined that the gripper 32 of the gripping module 3 is performing the second action at the speed of the target speed value, the controller 21 of the control module 2 samples the feedback voltage signal resulting from the gripping module 3 in the steady state period of the second action to obtain one of said another plurality of SGVs, and stores said one of said another plurality of SGVs in the storage 23 of the control module 2.

In sub-step (E-4), the controller 21 of the control module 2 determines whether the gripping position of the gripping module 3 matches a second predetermined position that the gripping module 3 is expected to reach when being driven by the driving voltage to perform the second action at the speed of the target speed value. The controller 21 of the control module 2 performs sub-step (E-1) once again when it is determined that the gripping position does not match the second predetermined position, and proceeds to step (F) when it is determined that the gripping position matches the second predetermined position.

In step (F), the controller 21 of the control module 2 averages said another plurality of SGVs to obtain the average SGV that corresponds to the target speed value and the second action, which is the action being performed.

In step (G), when it is determined by the control module 2 that i is not equal to N, the flow goes back to step (B) with i increased by one; and when it is determined by the control module 2 that i is equal to N, for each of the speed setting values that was assigned to serve as the target speed value, and for each of the actions the gripping module 3 was controlled to perform, the controller 21 of the control module 2 calculates the SGT based on the average SGV and an SGV deviation that is determined in advance in accordance with the speed setting value and the action (i.e., the first action or the second action), wherein the SGT is utilized for subsequent control of the electric gripper.

Figure 2D:
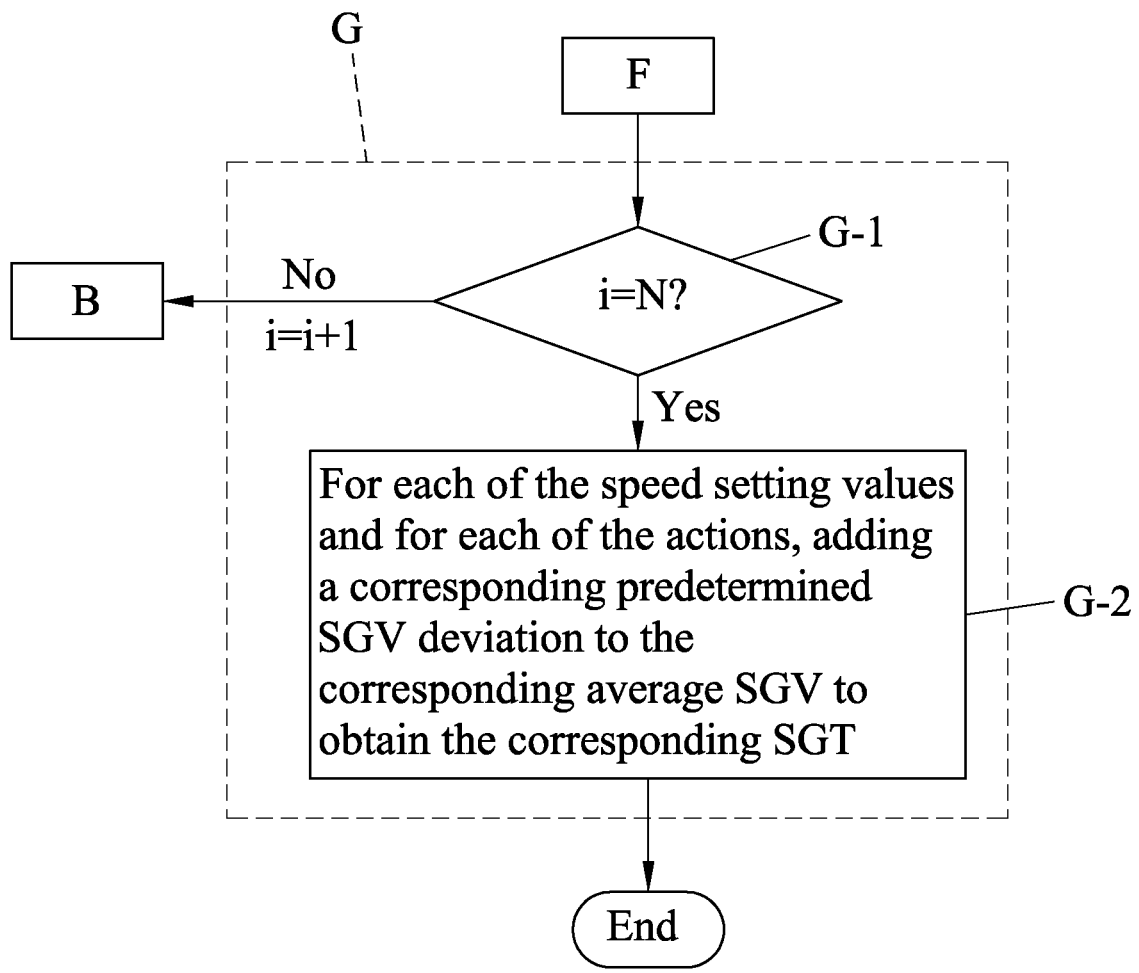

Specifically speaking, step (G) includes sub-steps (G-1) to (G-2) described in the following and illustrated in FIG. 2D.

In sub-step (G-1), the controller 21 of the control module 2 determines whether i is equal to N, and performs step (B) once again with i increased by one when it is determined that i is not equal to N.

When it is determined that i is equal to N, in sub-step (G-2), for each of the speed setting values that was assigned to serve as the target speed value and for each of the actions the gripping module 3 was controlled to perform, the controller 21 of the control module 2 adds the corresponding predetermined SGV deviation to the corresponding average SGV to obtain the corresponding SGT, and stores the corresponding SGT in the storage 23 of the control module 2.

Figure 5A:
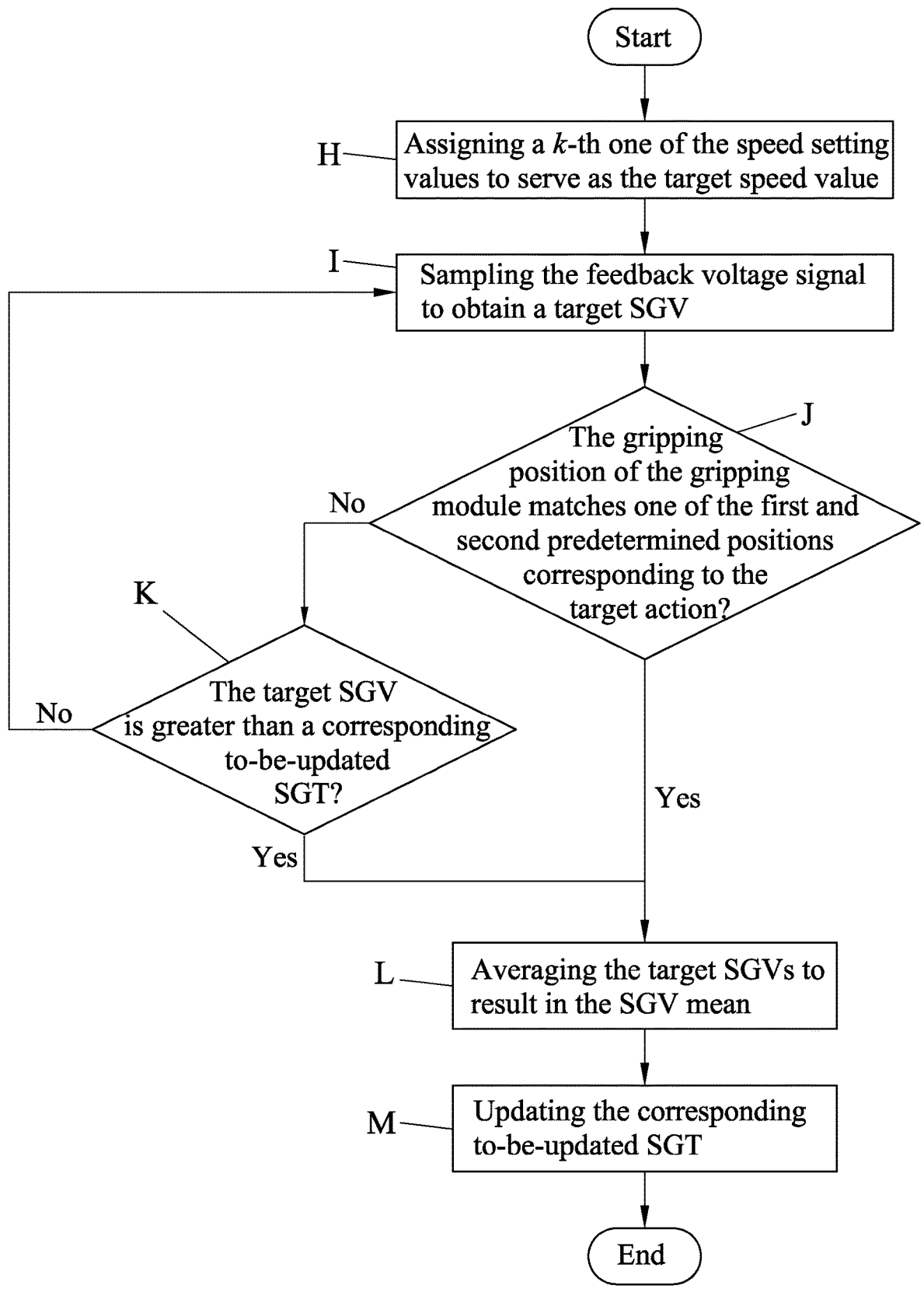
FIGS. 5A and 5B cooperatively illustrate a flow chart of an embodiment of an operating procedure of the adaptive control method according to the disclosure.
Figure 5B:
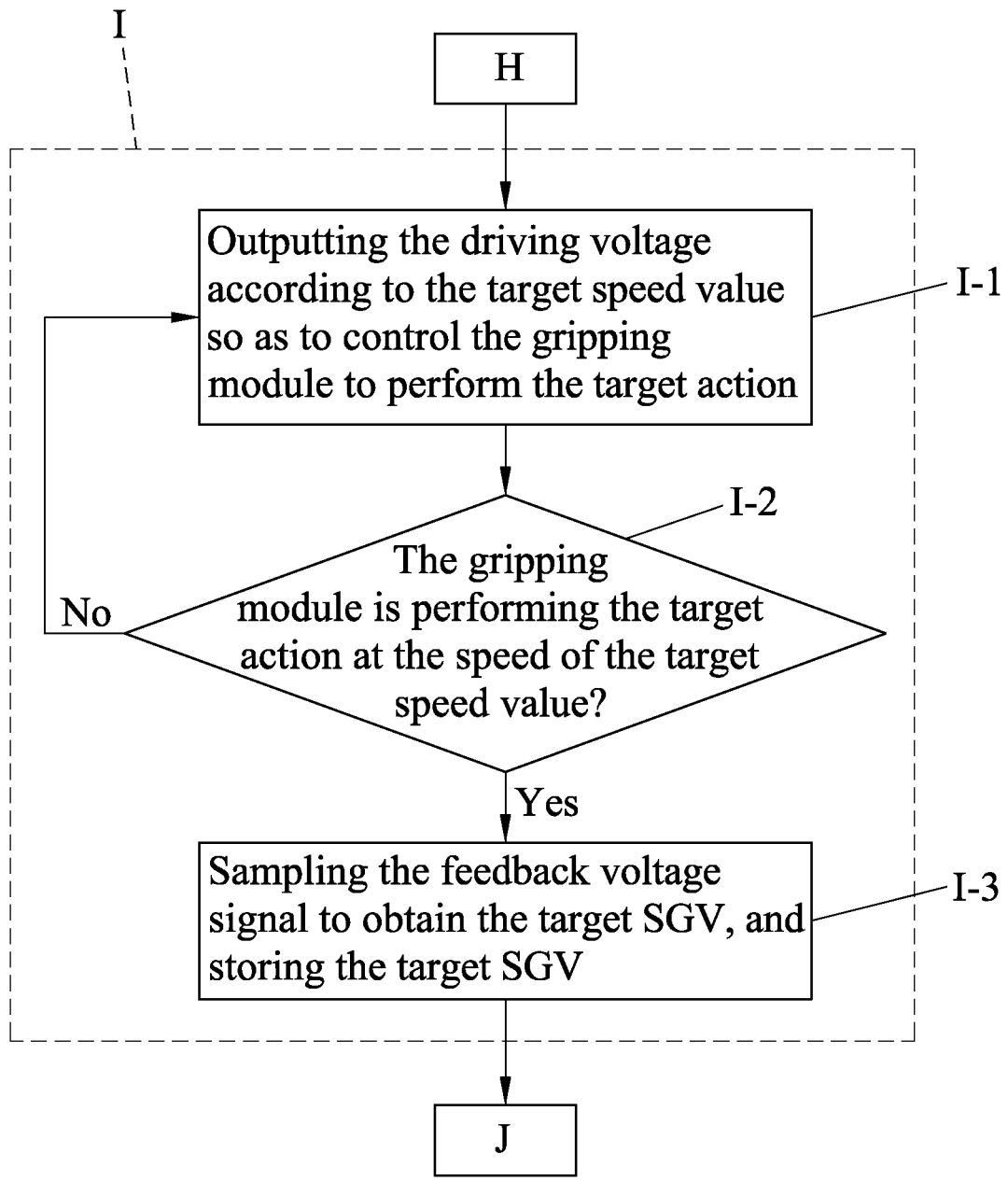

FIGS. 5A to 5B cooperatively illustrate an embodiment of the operating procedure of the adaptive control method according to this disclosure. The operating procedure of the adaptive control method includes steps (H) to (M) described as follows and illustrated in FIG. 5A.

In step (H), the controller 21 of the control module 2 assigns a k-th one of the speed setting values stored in the storage 23 to serve as the target speed value, where k is a positive integer not greater than N, and sets a target action to be one of the first action and the second action.

In step (I), when the gripping module 3 is controlled by the controller 21 of the control module 2 based on the target speed value and the target action to perform the target action in the steady state, the controller 21 of the control module 2 samples the feedback voltage signal resulting from the gripping module 3 and associated with the driving voltage to obtain a target SGV.

Specifically speaking, step (I) includes sub-steps (I-1) to (I-3) described in the following and illustrated in FIG. 5B.

In step (I-1), the controller 21 of the control module 2 generates the driving voltage according to the target speed value, and outputs the driving voltage so as to control the gripping module 3 to perform the target action. Specifically speaking, the controller 21 of the control module 2 controls the driver 22 to drive the motor 31 to actuate the gripper 32 to perform the target action at the target speed of the target speed value.

In step (I-2), the controller 21 of the control module 2 determines whether the gripper 32 of the gripping module 3 is performing the target action at the speed of the target speed value. The control module 2 performs step (I-1) once again when it is determined that the gripper 32 of the gripping module 3 is not performing the target action at the speed of the target speed value.

when it is determined that the gripper 32 of the gripping module 3 is performing the target action at the speed of the target speed value, in step (I-3), the controller 21 of the control module 2 samples the feedback voltage signal resulting from the gripping module 3 in the steady state period to obtain the target SGV, and stores the target SGV in the storage 23 of the control module 2.

In step (J), the controller 21 of the control module 2 determines whether the gripping position of the gripping module 3 matches one of the first and second predetermined positions corresponding to the target action and the target speed value. In this embodiment, the gripping position of the gripping module 3 is implemented to be the relative position of the fingers of the gripper 32, but implementation of the gripping position of the gripping module 3 may vary in other embodiments and is not limited to what is disclosed herein.

When it is determined that the gripping position does not match said one of the first and second predetermined positions, in step (K), the controller 21 of the control module 2 determines whether the target SGV obtained in step (I) is greater than a corresponding to-be-updated SGT which is one of the SGTs that corresponds to a combination of the target speed value (i.e., the k-th one of the speed setting values) and the target action (i.e., said one of the first action and the second action). The control module 2 performs step (I) once again when it is determined that the target SGV is not greater than the corresponding to-be-updated SGT.

When it is determined in step (J) that the gripping position matches said one of the first and second predetermined positions or when it is determined in step (K) that the target SGV obtained in step (I) is greater than the corresponding to-be-updated SGT, in step (L) the controller 21 of the control module 2 averages the target SGVs obtained in repetitions of step (I) to obtain the SGV mean that corresponds to the target speed value and the target action.

In step (N), the controller 21 of the control module 2 updates the corresponding to-be-updated SGT based on the SGV mean obtained in step (L) and the predetermined SGV deviation that is determined in advance in accordance with the target speed value (i.e., the k-th one of the speed setting values) and the target action (i.e., said one of the first action and the second action). The SGT thus updated is utilized to serve as the operational parameter for a next round of control of the electric gripper to perform the desired action at the desired speed value. In this way, a machine including the electric gripper may constantly function normally so as to promote production capacity of a production line.

In summary, the reset procedure of the adaptive control method according to this disclosure utilizes the control module 2 of the electric gripper to sample the feedback voltage signal resulting from the gripping module 3 to obtain the SGVs when the gripping module 3 is performing one of the first and second actions at the speed of the target speed value in the steady state period, to average the SGVs to obtain the corresponding average SGV, and to calculate the corresponding SGT based on the corresponding average SGV and the corresponding predetermined SGV deviation. Therefore, the electric gripper can be further controlled according to the SGTs. The operational procedure of the adaptive control method according to this disclosure utilizes the control module 2 to sample the feedback voltage signal resulting from the gripping module to obtain the target SGVs when the gripping module is performing the target action at the speed of the target speed value in the steady state period, to average the target SGVs to obtain the SGV mean, and to update the corresponding to-be-updated SGT based on the SGV mean and the corresponding predetermined SGV deviation.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An adaptive control method for an electric gripper, to be implemented by the electric gripper including a gripping module and a control module, which generates a driving voltage to control actions to be performed by the gripping module, the adaptive control method comprising steps of:
   (a) storing, by the control module, N number of different speed setting values, where N is a positive integer not smaller than two;
   (b) assigning, by the control module, an i-th one of the speed setting values to serve as a target speed value, where i is a positive integer not greater than N and starts from one;
   (c) sampling, by the control module when the gripping module is performing a first action which is one of the actions in a steady state period during which the gripping module performs said one of the actions at a speed of the target speed value, a feedback voltage signal resulting from the gripping module and associated with the driving voltage to obtain a plurality of Stall Guard Values (SGVs);
   (d) averaging, by the control module, the SGVs to obtain an average SGV that corresponds to the target speed value and the first action; and
   (e) when it is determined by the control module that i is not equal to N, repeating, by the control module, steps (b) to (d) with i increased by one, and when it is determined by the control module that i is equal to N, for each of the speed setting values that was assigned to serve as the target speed value, calculating, by the control module based on the average SGV and a predetermined SGV deviation that is determined in advance in accordance with the speed setting vale and the first action during performance of which the feedback voltage signal was sampled to obtain the plurality of SGVs, a Stall Guard Threshold (SGT) which is utilized for subsequent control of the electric gripper.

2. The adaptive control method as claimed in claim 1, wherein step (c) includes sub-steps of:
   (c-1) outputting, by the control module, the driving voltage according to the target speed value so as to control the gripping module to perform the first action;
   (c-2) by the control module, determining whether the gripping module is performing the first action at the speed of the target speed value, and performing sub-step (c-1) once again when it is determined that the gripping module is not performing the first action at the speed of the target speed value;
   (c-3) by the control module, sampling, when it is determined that the gripping module is performing the first action at the speed of the target speed value, the feedback voltage signal resulting from the gripping module in the steady state period to obtain one of the SGVs, and storing said one of the SGVs in the control module; and
   (c-4) by the control module, determining whether a gripping position of the gripping module matches a first predetermined position that the gripping module is expected to reach when being driven by the driving voltage to perform the first action at the speed of the target speed value, performing sub-step (c-1) once again when it is determined that the gripping position does not match the first predetermined position, and proceeding to step (d) when it is determined that the gripping position matches the first predetermined position.

3. The adaptive control method as claimed in claim 1, further comprising, subsequent to step (d) and prior to step (e):
   (f) sampling, by the control module when the gripping module is performing a second action which is one of the actions in the steady state period, the feedback voltage signal resulting from the gripping module and associated with the driving voltage to obtain another plurality of SGVs; and
   (g) averaging, by the control module, said another plurality of SGVs to obtain an average SGV that corresponds to the target speed value and the second action,
   wherein step (e) includes, when it is determined by the control module that i is equal to N, for each of the speed setting values that was assigned to serve as the target speed value, and for each of the actions the gripping module was controlled to perform, calculating the SGT that corresponds to the speed setting value and the action, by the control module based on the average SGV that corresponds to the speed setting value and the action, and the predetermined SGV deviation that is determined in advance in accordance with the speed setting value and the action.

4. The adaptive control method as claimed in claim 3, wherein step (f) includes sub-steps of:
(f-1) outputting, by the control module, the driving voltage according to the target speed value so as to control the gripping module to perform the second action;
(f-2) by the control module, determining whether the gripping module is performing the second action at the speed of the target speed value, and performing sub-step (f-1) once again when it is determined that the gripping module is not performing the second action at the speed of the target speed value;
(f-3) by the control module, sampling, when it is determined that the gripping module is performing the second action at the speed of the target speed value, the feedback voltage signal resulting from the gripping module in the steady state period to obtain one of said another plurality of SGVs, and storing said one of said another plurality of SGVs in the control module; and
(f-4) by the control module, determining whether the gripping position of the gripping module matches a second predetermined position that the gripping module is expected to reach when being driven by the driving voltage to perform the second action at the speed of the target speed value, performing sub-step (f-1) once again when it is determined that the gripping position does not match the second predetermined position, and proceeding to step (g) when it is determined that the gripping position matches the second predetermined position.

5. The adaptive control method as claimed in claim 3, wherein step (e) includes sub-steps of:
(e-1) by the control module, determining whether i is equal to N, and performing steps (b) to (d) once again with i increased by one when it is determined that i is not equal to N; and
(e-2) when it is determined that i is equal to N, for each of the speed setting values that was assigned to serve as the target speed value and for each of the actions the gripping module was controlled to perform, by the control module, adding the predetermined SGV deviation that corresponds to the speed setting value and the action to the average SGV that corresponds to the speed setting value and the action to obtain the SGT that corresponds to the speed setting value and the action, and storing the SGT.

6. The adaptive control method as claimed in claim 3, further comprising:
(h) by the control module, assigning a k-th one of the speed setting values to serve as the target speed value, where k is a positive integer not greater than N, and setting a target action which is selected from one of the first action and the second action;
(i) sampling, by the control module when the gripping module is controlled by the control module based on the target speed value and the target action to perform the target action in the steady state period, the feedback voltage signal resulting from the gripping module and associated with the driving voltage to obtain a target SGV;
(j) determining, by the control module, whether the gripping position of the gripping module matches one of the first and second predetermined positions corresponding to the target action and the target speed value;
(k) by the control module, determining, when it is determined that the gripping position does not match said one of the first and second predetermined positions, whether the target SGV obtained in step (i) is greater than a corresponding to-be-updated SGT which is one of the SGTs that corresponds to a combination of the target speed value and the target action, and performing step (i) once again when it is determined that the target SGV is not greater than the corresponding to-be-updated SGT;
(l) averaging, by the control module when it is determined in step (j) that the gripping position matches said one of the first and second predetermined positions or when it is determined in step (k) that the target SGV obtained in step (i) is greater than the corresponding to-be-updated SGT, the target SGVs obtained in repetitions of step (i) to obtain an SGV mean that corresponds to the target speed value and the target action; and
(m) updating, by the control module, the corresponding to-be-updated SGT based on the SGV mean obtained in step (l) and the predetermined SGV deviation that is determined in advance in accordance with the target speed value and the target action.

7. The adaptive control method as claimed in claim 6, wherein step (i) includes sub-steps of:
(i-1) outputting, by the control module, the driving voltage according to the target speed value so as to control the gripping module to perform the target action;
(i-2) by the control module, determining whether the gripping module is performing the target action at the speed of the target speed value, and performing step (i-1) once again when it is determined that the gripping module is not performing the target action at the speed of the target speed value; and
(i-3) by the control module, sampling, when it is determined that the gripping module is performing the target action at the speed of the target speed value, the feedback voltage signal resulting from the gripping module in the steady state period to obtain the target SGV, and storing the target SGV in the control module.

8. An electric gripper comprising:
a gripping module; and
a control module configured to
generate a driving voltage to control actions to be performed by the gripping module,
store N number of different speed setting values, where N is a positive integer not smaller than two, and
for each i, where i is a positive integer from one to N with an increment of one,
assign an i-th one of the speed setting values to serve as a target speed value,
sample, when the gripping module is performing one of the actions in a steady state period during which the gripping module performs said one of the actions at a speed of the target speed value, a feedback voltage signal resulting from the gripping module and associated with the driving voltage to obtain a plurality of Stall Guard Values (SGVs),
average the SGVs to obtain an average SGV that corresponds to the target speed value and said one of the actions being performed, and
calculate, based on the average SGV and a predetermined SGV deviation that is determined in advance in accordance with the target speed value and said one of the actions during performance of which the feedback voltage signal was sampled to obtain the plurality of SGVs, a Stall Guard Threshold (SGT) which is utilized for subsequent control of the electric gripper.

9. An adaptive control method for an electric gripper, to be implemented by the electric gripper including a gripping module and a control module, which generates a driving voltage to control actions to be performed by the gripping module, the adaptive control method comprising steps of:
 (a) storing, by the control module, N number of different speed setting values, where N is a positive integer not smaller than two;
 (b) assigning, by the control module, one of the speed setting values to serve as a target speed value;
 (c) sampling, by the control module when the gripping module is performing one of the actions in a steady state period during which the gripping module performs said one of the actions at a speed of the target speed value, a feedback voltage signal resulting from the gripping module and associated with the driving voltage to obtain a plurality of Stall Guard Values (SGVs);
 (d) averaging, by the control module, the SGVs to obtain an average SGV that corresponds to the target speed value and said one of the actions; and
 (e) calculating, by the control module based on the average SGV and a predetermined SGV deviation that is determined in advance in accordance with the target speed value and said one of the actions during performance of which the feedback voltage signal was sampled to obtain the plurality of SGVs, a Stall Guard Threshold (SGT) which is utilized for subsequent control of the electric gripper.

* * * * *